(12) United States Patent
Ikeda et al.

(10) Patent No.: US 8,623,930 B2
(45) Date of Patent: Jan. 7, 2014

(54) THERMOPLASTIC RESIN FOAM, METHOD OF PRODUCING THE SAME, AND LIGHT REFLECTING MATERIAL THEREOF

(71) Applicant: Furukawa Electric Co., ;td., Tokyo (JP)

(72) Inventors: Hideyuki Ikeda, Tokyo (JP); Minoru Saito, Tokyo (JP); Kojiro Inamori, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/777,050

(22) Filed: Feb. 26, 2013

(65) Prior Publication Data

US 2013/0172438 A1    Jul. 4, 2013

Related U.S. Application Data

(63) Continuation of application No. PCT/JP2011/069190, filed on Aug. 25, 2011.

(30) Foreign Application Priority Data

Aug. 27, 2010  (JP) ................................. 2010-191038

(51) Int. Cl.
  *C08J 9/12* (2006.01)
  *C08K 5/20* (2006.01)
(52) U.S. Cl.
  USPC ................... 521/94; 521/82; 521/50; 521/97
(58) Field of Classification Search
  USPC ........................................................ 521/182
  See application file for complete search history.

(56) References Cited

U.S. PATENT DOCUMENTS

| 5,844,731 A | 12/1998 | Kabumoto et al. |
| 2002/0057405 A1 | 5/2002 | Morishita et al. |
| 2005/0270671 A1 | 12/2005 | Nousou et al. |
| 2007/0269719 A1 | 11/2007 | Sadamitsu et al. |

FOREIGN PATENT DOCUMENTS

| DE | 10233703 A1 * | 2/2004 |
| JP | 4-268345 A | 9/1992 |
| JP | 2002-122863 A | 4/2002 |
| JP | 2004-138715 A | 5/2004 |
| WO | WO 97/01117 A1 | 1/1997 |
| WO | WO 02/066233 A1 | 8/2002 |
| WO | WO 2007/142260 A1 | 12/2007 |

OTHER PUBLICATIONS

Stumpf, M. "Influence of organic additives on foam morphology of injection-moulded i-PP" in Blowing Agents and Foaming Processes 2009, International Conference, 11th, Hamburg, Germany, May 19-20, 2009. 10 pages.*

Fujimoto, Y; Ray, S.S.; Okamoto, M.; Ogami, A.; Yamada, K.; Ueda, K. "Well-Controlled Biodegradable Nanocomposite Foams: From Microcellular to Nanocellular" in Macromol. Rapid Commun. 2003, 24, p. 457-461.*

International Search Report, issued in PCT/JP2011/069190, dated Oct. 18, 2011.

* cited by examiner

*Primary Examiner* — Randy Gulakowski
*Assistant Examiner* — Christina Wales
(74) *Attorney, Agent, or Firm* — Birch, Stewart, Kolasch & Birch, LLP

(57) ABSTRACT

{Problems}

The present invention is contemplated for providing a thermoplastic resin foam and a light reflecting material having a high reflectivity when being made thin, as well as a method of producing the thermoplastic resin foam.

{Means to Solve}

A thermoplastic resin foam, prepared by using a thermoplastic resin composition containing a melt-type crystallization nucleating agent (B) in a crystalline thermoplastic resin (A), which foam comprises a bubble having a mean bubble diameter of less than 1 μm in the inside thereof.

8 Claims, No Drawings

THERMOPLASTIC RESIN FOAM, METHOD OF PRODUCING THE SAME, AND LIGHT REFLECTING MATERIAL THEREOF

CROSS-REFERENCE TO RELATED APPLICATIONS

This application is a Continuation of PCT/JP2011/069190 filed on Aug. 25, 2011, which claims priority under 35 U.S.C § 119(a) to Patent Application No. 2010-191038 filed in Japan on Aug. 27, 2010, all of which are hereby expressly incorporated by reference into the present application.

TECHNICAL FIELD

The present invention relates to a thermoplastic resin foam having fine bubbles in the inside thereof, and a production method of the thermoplastic resin foam and a light reflecting material thereof.

BACKGROUND ART

Synthetic resin films or sheets, which reflect light, have been conventionally used for backlights of electrical spectacular signs, lighting apparatuses, displays, or the like. For example, light reflecting plates, which are obtained by processing synthetic resin films or sheets into stereoscopic shapes in order to suppress brightness unevenness, have been proposed (for example, see Patent Literature 1).

However, when the thermoplastic resin foam films or sheets are processed into stereoscopic shapes, the films or sheets are deformed due to strain in molding or constriction after molding. Accordingly, a means has been proposed, which prevents a light reflecting plate from deforming by fixing a light reflecting plate subjected to shape processing and a metallic casing (For example, see Patent Literature 2).

In recent years, power saving and high efficiency have been required in the fields of lighting apparatuses, liquid crystal displays, and the like. Therefore, a resin film or sheet having a higher reflectivity has been desired. In particular, needs for space saving has been enhanced in the fields of electrical spectacular signs and displays, and it has been required to make a resin film or sheet, which reflects light, thinner. It is hard to make the above described light reflecting plate meet the requirements when making a thinner product.

Accordingly, a thermoplastic resin foam film or sheet having many fine bubbles or pores in the inside thereof has been proposed as a synthetic resin film or sheet, which reflects light (for example, see Patent Literature 3). The thermoplastic resin foam film or sheet has a mean bubble diameter as fine as approximately 10 μm, and therefore exhibits a high reflectance.

CITATION LIST

Patent Literatures

Patent Literature 1: JP-A-2002-122863 ("JP-A" means unexamined published Japanese patent application)
Patent Literature 2: JP-A-2004-138715
Patent Literature 3: WO 97/01117

SUMMARY OF INVENTION

Technical Problem

However, a foam sheet having a mean bubble diameter of approximately 10 μm has a problem that transmitted light increases when the sheet is made thin. Therefore, a desired reflectivity cannot be maintained.

The present invention is contemplated for solving the above described problem and providing a thermoplastic resin foam and a light reflecting material having a high reflectance when made thin, as well as a method of producing the thermoplastic resin foam.

Solution to Problem

The present inventors intensively studied in order to solve the above described problems; as a result, they found that a thermoplastic resin foam having a high reflectivity even when formed into a thin film can be produced by adding a specific melt-type crystallization nucleating agent to a thermoplastic resin, and thereby solving the problem. The present invention was attained based on this finding.

According to the present invention, there is provided the following means:

<1> A thermoplastic resin foam, prepared by using a thermoplastic resin composition containing a melt-type crystallization nucleating agent (B) in a crystalline thermoplastic resin (A), which foam comprises a bubble having a mean bubble diameter of less than 1 μm in the inside thereof;

<2> The thermoplastic resin foam as described in the item <1>,
wherein the crystalline thermoplastic resin (A) is a crystalline polyester resin;

<3> The thermoplastic resin foam as described in the item <1> or <2>,
wherein the melt-type crystallization nucleating agent (B) is contained in an amount of 0.1 to 2.0 part(s) by mass, with respect to 100 parts by mass of the crystalline thermoplastic resin (A);

<4> The thermoplastic resin foam as described in any one of the items <1> to <3>,
wherein a total reflectivity at a light wavelength of 550 nm is 100% or more in terms of an aluminum oxide ratio;

<5> A light reflecting material, which is molded by using the thermoplastic resin foam as described in any one of the items <1> to <4>;

<6> A method of producing a thermoplastic resin foam, comprising the steps of:
impregnating a resin composition sheet containing a crystalline thermoplastic resin (A) and a melt-type crystallization nucleating agent (B) with an inert gas by maintaining the sheet in a pressurized inert gas atmosphere; and
foaming by heating the sheet impregnated with the inert gas under normal pressure;

<7> The method of producing a thermoplastic resin foam as described in the item <6>,
wherein the crystalline thermoplastic resin (A) is a crystalline polyester resin; and <8> The method of producing a thermoplastic resin foam as described in the item <6> or <7>,
wherein the melt-type crystallization nucleating agent (B) is contained in an amount of 0.1 to 2.0 part(s) by mass, with respect to 100 parts by mass of the crystalline thermoplastic resin.

Advantageous Effects of Invention

The present invention can provide a thermoplastic resin foam having a high reflectivity even when formed into a thin film, and a method of producing the thermoplastic resin foam, and a reflecting material using the thermoplastic resin foam, which is excellent in light reflectivity, such as a backlight of electrical spectacular signs, a lighting apparatus or a display, a lighting box, and the like.

Other and further features and advantages of the invention will appear more fully from the following description.

MODE FOR CARRYING OUT THE INVENTION

The thermoplastic resin foam of the present invention is obtained by foaming a resin composition obtained from a crystalline thermoplastic resin (A) containing a melt-type crystallization nucleating agent (B). Firstly, in the thermoplastic resin foam of the present invention, the crystalline thermoplastic resin (A) will be described.

(A) Crystalline Thermoplastic Resin

The term "crystalline" means that resin molecules form a regular configurational structure (crystal structure) in a certain temperature range of Tg or higher. Such crystallinity is defined based on a crystallization calorie by a differential scanning calorimeter. Being crystalline in the present invention means having 5.0 J/g or more of a calorie calculated from an exothermic peak (crystallization peak), when a thermoplastic resin is heated at a melting temperature or more and then the temperature is dropped at 10° C./min. The crystallization calorie is preferably 10.0 J/g or more, and more preferably 50 J/g or less.

Examples of the crystalline thermoplastic resin (A) that can be used in the present invention include a polyester, a polyamide, a white linear-type polyphenylene sulfide, a syndiotactic polystyrene, and a polyether ketone. Among them, a polyester is particularly preferable. In the present invention, a crystalline thermoplastic resin may be used singly, or two or more kinds thereof may be used in mixture.

Examples of the above-mentioned polyester include copolymer polyesters such as a poly(ethylene isophthalate/terephthalate), a poly(butylene isophthalate/terephthalate), a poly(ethylene terephthalate/naphthalate), a poly(butylene isoterephthalate), and a poly(butylene isonaphthalate), in addition to a poly(butylene terephthalate), a poly(ethylene terephthalate), a poly(ethylene naphthalate), and a poly(butylene naphthalate). Among them, a poly(ethylene terephthalate) resin is particularly preferable from the viewpoints of crystallinity and a foaming property.

In the present invention, a thermoplastic resin is preferably non-crosslinked from the viewpoint of recycling. The thermoplastic resin in the present invention preferably has a mass fraction of a crosslinked portion in the thermoplastic resin (hereinafter, also referred to as a crosslinking degree in the specification) of less than 10%. A crosslinking agent or a crosslinking aid may be added as long as the crosslinking degree of a thermoplastic resin is less than 10%.

(B) Melt-Type Crystallization Nucleating Agent

The term "melt-type crystallization nucleating agent" indicates a nucleating agent which is characterized by melting and dispersing in a resin in melt-kneading when added to a thermoplastic resin and being coagulated and solidified in a temperature-dropping coagulation step.

In the present invention, the melt-type crystallization nucleating agent (B) is molten and dispersed to the crystalline thermoplastic resin (A) in molding. In temperature-dropping solidification or gas impregnation after molding, the melt-type crystallization nucleating agent (B) deposits in the crystalline thermoplastic resin (A). As a result, the melt-type crystallization nucleating agent (B) is crystallized. In the foaming step, the deposited melt-type crystallization nucleating agent (B) is the starting point of formation of a bubble nucleus. As a result, a foam having fine pores with a mean bubble diameter of less than 1 μm uniformly in the inside thereof can be obtained. Such a foam is molded and a reflecting material having a high reflectivity can be thus obtained.

A melt-type crystallization nucleating agent used in the present invention is not particularly limited, but examples thereof include N,N'-dicyclohexyl-2,6-naphthalenedicarboxamide, trimesic acid tris(t-butylamide), trimesic acid tricyclohexylamide, trimesic acid tri(2-methylcyclohexylamide), trimesic acid tri(4-methylcyclohexylamide), 1,4-cyclohexane dicarboxylic acid dianilide, 1,4-cyclohexanoic acid dicarboxylic acid dicyclohexylamide, 1,4-cyclohexanoic acid dicarboxylic acid di(2-methylcyclohexylamide), 1,4-cyclohexanoic acid dicarboxylic acid dibenzylamide, 2,6-naphthalene dicarboxylic acid dicyclohexylamide, 1,2,3,4-butane tetracarboxylic acid tetracyclohexylamide and 1,2,3,4-butane tetracarboxylic acid tetraanilide. These substances may be used singly, or two or more kinds thereof may be used in mixture. Among these examples, N,N'-dicyclohexyl-2,6-naphthalenedicarboxamide is preferable from the viewpoints of transparency and a particle diameter of a generated crystal.

A specific gravity of a thermoplastic resin foam in the present invention is preferably 0.7 or less, more preferably 0.65 or less, and further more preferably 0.5 or less. In the present invention, a large specific gravity, that is, decrease of an expansion ratio, leads to lowering of a reflectivity due to reduction of a bubble ratio, and lowering of moldability or decrease of a down-sizing effect.

In the present invention, a blending amount of (B) is 0.1 to 2 part(s) by mass with respect to 100 parts by mass of the crystalline thermoplastic resin (A). The blending amount is preferably 0.25 to 1.5 part(s) by mass. When the blending amount of the melt-type crystallization nucleating agent is too small, a crystal nucleus generated by undergoing a crystallization step of a melt-type crystallization nucleating agent due to gas impregnation is hardly generated and a bubble diameter distribution of a foam thus becomes large. When the blending amount of the melt-type crystallization nucleating agent is too large, since crystallization excessively proceeds, a crystalline nucleus becomes too large and has a grain shape, and functions as a bubble nucleating agent are insufficient, a high expansion ratio cannot be obtained.

In the present invention, various additives such as a crystallization accelerating agent, a foam nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a plasticizer, a thickening agent, and a thinning agent can be suitably blended to a thermoplastic resin (A) before foaming within the range not damaging the object of the present invention. Further, a resin containing the above described additives may be laminated to the obtained thermoplastic resin foam, or a coating material containing the above described additives may be applied thereto.

A method of producing the thermoplastic resin foam of the present invention will be described below.

A crystalline thermoplastic resin (A) and a melt-type crystallization nucleating agent (B) are melt-kneaded using, for example, a kneader or an extruder, thereby preparing a resin composition. Kneading conditions such as a kneading temperature and a kneading time can be suitably set to a temperature at which the crystalline thermoplastic resin (A) and the melt-type crystallization nucleating agent (B) are molten. The thus-obtained resin composition is formed into a sheet using an extruder or the like thereby to obtain a resin sheet, and the resin sheet and a separator are overlapped and rolled to be formed into a roll. The roll is maintained in a pressurized inert gas atmosphere, thus letting the resin sheet contain the inert gas. Further, the resin sheet containing the inert gas is heated at the softening temperature of the crystalline thermoplastic resin (A) or more under normal pressure thereby to be foamed. A thermoplastic resin foam is thus obtained.

Examples of the inert gas include helium, nitrogen, carbon dioxide, and argon. A permeation time of an inert gas and an impregnation amount of an inert gas until a resin sheet attains a saturated state are different depending on a kind of a resin to be foamed, a kind of an inert gas, a permeation pressure and a sheet thickness. Among these examples, carbon dioxide is preferable from the viewpoint of permeability of a gas into a resin (speed, solubility).

In addition, an organic solvent may be contained in the resin sheet before containing an inert gas in a roll made of the resin sheet and a separator in a pressurized inert gas atmosphere in this method.

Examples of the organic solvent include benzene, toluene, methyl ethyl ketone, ethyl formate, acetone, acetic acid, dioxane, m-cresol, aniline, acrylonitrile, dimethyl phthalate, nitroethane, nitromethane, and benzyl alcohol. Among them, acetone is preferable from the viewpoints of handling property and economical efficiency.

In the present invention, a mean diameter of a bubble present in the thermoplastic resin foam according to the present invention is less than 1 µm. In particular, the mean diameter is preferably 0.75 µm or less, and particularly preferably 0.5 µm or less. When the mean bubble diameter is too large, a desired high reflectivity cannot be obtained.

In the present invention, the total reflectivity at a light wavelength of 550 nm of the thermoplastic resin foam is preferably 98% or more by an aluminum oxide ratio. In particular, the total reflectivity is preferably 100% or more, and particularly preferably 101% or more. The term "total reflectivity" mentioned herein is a relative value shown with a reflectivity of an aluminum oxide white plate (210-0740: manufactured by Hitachi High-Tech Fielding Corporation) being set at 100% at a wavelength of 550 nm, using a spectrophotometer (U-4100: manufactured by Hitachi High-Tech Fielding Corporation).

EXAMPLES

The present invention will be described in more detail based on examples given below, but the invention is not meant to be limited by these.

The following evaluations were carried out on examples and comparative examples. Respective tests and evaluations thereof were performed in the methods below.
(1) Sheet Thickness 4 corners, 4 sides of a sample and the thickness in the center of a sheet were measured by a micrometer and a mean value of the total 9 points was determined to be a sheet thickness.
(2) Mean Bubble Diameter A mean bubble diameter was determined in accordance with ASTM D3576-77. In other words, a SEM photograph was taken of a cross-section of the sheet. Straight lines were drawn on the SEM photograph in a horizontal direction and a vertical direction. A length t of a chord of a bubble through which the straight lines pass was averaged. A magnification of the photograph, M, was assigned to an expression below and a mean bubble diameter d was determined.

$$d = t/(0.616 \times M)$$

(3) Specific Gravity

A specific gravity of a foam sheet was measured by an underwater replacement method.
(4) Expansion Ratio An expansion ratio was calculated as a ratio ρs/ρf of the specific gravity (pρ) of the foam sheet measured by the underwater replacement method and a specific gravity of the resin before foaming (pρ).
(5) Reflectivity Light transmissions of 0.8 mm-thick sample and a sample obtained by grinding out from a 0.8 mm-thick sample to have a thickness of 0.3 mm were measured. The spectral total reflectivity was measured in each sample at a wavelength of 550 nm in the condition of a spectral slit of 4 nm using a spectrophotometer (U-4100: manufactured by Hitachi High-Technologies Corporation). An aluminum oxide white plate (210-0740: manufactured by Hitachi High-Tech Fielding Corporation) was used as a reference, and the measured values were relative values to the reference.
(6) Crystallinity On the respective resins described in each of the examples and each of the comparative examples, after heating at a melting temperature or higher using a differential scanning calorimeter (DSC), the temperature was dropped at 10° C./min and a calorie of an exothermic peak (crystallization peak) measured in this time was measured. DSC60A (trade name) manufactured by SHIMADZU CORPORATION was used as DSC.

Example 1

0.25 part by mass of a melt-type crystallization nucleating agent (trade name: NU-100, manufactured by New Japan Chemical Co., Ltd.) was blended with respect to 100 parts by mass of a poly(ethylene terephthalate) (trade name: NEH2070, manufactured by Unitika Ltd., IV value=0.85, temperature dropping crystallization peak=35 J/g) and the mixture was heated and melt-kneaded with a twin screw extruder, the thus-obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in a hot-air circulating foam furnace set at 220° C. for 1 minute. The mean bubble diameter of the obtained sheet was as fine as 0.5 µm. The thickness of the foam was 0.8 mm. The total reflectivity of the foam sheet was 101%. The total reflectivity of the sheet ground out to have a thickness of 0.3 mm was 101%.

Example 2

0.5 part by mass of a melt-type crystallization nucleating agent (trade name: NU-100, manufactured by New Japan Chemical Co., Ltd.) was blended with respect to 100 parts by mass of a poly(ethylene terephthalate) (trade name: NEH2070, manufactured by Unitika Ltd., IV value=0.85, temperature dropping crystallization peak=35 J/g) and the mixture was heated and melt-kneaded with a twin screw extruder, the obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in the hot-air circulating foam furnace set at 220° C. for 1 minute. The mean bubble diameter of the obtained sheet was as fine as 0.5 μm. The thickness of the foam was 0.8 mm. The total reflectivity of the foam sheet was 101%. The total reflectivity of the sheet ground out to have a thickness of 0.3 mm was 101%.

Example 3

1.0 part by mass of a melt-type crystallization nucleating agent (trade name: NU-100, manufactured by New Japan Chemical Co., Ltd.) was blended with respect to 100 parts by mass of a poly(ethylene terephthalate) (trade name: NEH2070, manufactured by Unitika Ltd., IV value=0.85, temperature dropping crystallization peak=35 J/g) and the mixture was heated and melt-kneaded with a twin screw extruder, the obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in the hot-air circulating foam furnace set at 220° C. for 1 minute. The mean bubble diameter of the obtained sheet was as fine as 0.5 μm. The thickness of the foam was 0.8 mm. The total reflectivity of the foam sheet was 101%. The total reflectivity of the sheet ground out to have a thickness of 0.3 mm was 101%.

Example 4

1.5 parts by mass of a melt-type crystallization nucleating agent (trade name: NU-100, manufactured by New Japan Chemical Co., Ltd.) was blended with respect to 100 parts by mass of a polyethylene terephthalate) (trade name: NEH2070, manufactured by Unitika Ltd., IV value=0.85, temperature dropping crystallization peak=35 J/g) and the mixture was heated and melt-kneaded with a twin screw extruder, the obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in the hot-air circulating foam furnace set at 220° C. for 1 minute. The mean bubble diameter of the obtained sheet was as fine as 0.5 μm. The thickness of the foam was 0.8 mm. The total reflectivity of the foam sheet was 101%. The total reflectivity of the sheet ground out to have a thickness of 0.3 mm was 101%.

Example 5

1.0 part by mass of a melt-type crystallization nucleating agent (trade name: TF1, manufactured by New Japan Chemical Co., Ltd.) was blended with respect to 100 parts by mass of a poly(ethylene terephthalate) (trade name: NEH2070, manufactured by Unitika Ltd., IV value=0.85, temperature dropping crystallization peak=35 J/g) and the mixture was heated and melt-kneaded with a twin screw extruder, the obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in the hot-air circulating foam furnace set at 220° C. for 1 minute. The mean bubble diameter of the obtained sheet was as fine as 0.5 μm. The thickness of the foam was 0.8 mm. The total reflectivity of the foam sheet was 100%. The total reflectivity of the sheet ground out to have a thickness of 0.3 mm was 100%.

Example 6

0.1 part by mass of a melt-type crystallization nucleating agent (trade name: NU-100, manufactured by New Japan Chemical Co., Ltd.) was blended with respect to 100 parts by mass of a poly(ethylene terephthalate) (trade name: NEH2070, manufactured by Unitika Ltd., IV value=0.85, temperature dropping crystallization peak=35 J/g) and the mixture was heated and melt-kneaded with a twin screw extruder, the obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in the hot-air circulating foam furnace set at 220° C. for 1 minute. The mean bubble diameter of the obtained sheet was as fine as 0.5 μm. The thickness of the foam was 0.8 mm. The total reflectivity of the foam sheet was 101%. The total reflectivity of the sheet ground out to have a thickness of 0.3 mm was 101%.

Example 7

2.0 parts by mass of a melt-type crystallization nucleating agent (trade name: NU-100, manufactured by New Japan Chemical Co., Ltd.) was blended with respect to 100 parts by mass of a polyethylene terephthalate) (trade name: NEH2070, manufactured by Unitika Ltd., IV value=0.85, temperature dropping crystallization peak=35 J/g) and the mixture was heated and melt-kneaded with a twin screw extruder, the obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in the hot-air circulating foam furnace set at 220° C. for 1 minute. The mean bubble diameter of the obtained sheet was as fine as 0.5 μm. The thickness of the foam was 0.8 mm. The total reflectivity of the foam sheet was 100%. The total reflectivity of the sheet ground out to have a thickness of 0.3 mm was 100%.

COMPARATIVE EXAMPLES

In the following comparative examples, a polyester elastomer that is a conventional foam nucleating agent (Comparative example 1), a modified SEBS (a modified styrene-butylene-styrene copolymer) (Comparative example 2), and a modified PE (Comparative example 3) were used. All of these are molten and simultaneously melt the crystalline thermoplastic resin (A), but are not crystallized with a resin composition at the time of temperature dropping solidification or gas impregnation.

Comparative Example 1

A foam was obtained in the same manner as in the example 1 except for adding 2.0 parts by mass of a polyester-based elastomer (trade name: Hytrel 2551, manufactured by Toray Industries, Inc.) with respect to 100 parts by mass of a poly (ethylene terephthalate) (trade name: SA1206, manufactured by Unitika Ltd., IV value=1.05, calorie of exothermic peak: 35 J/g). The mean bubble diameter of the obtained sheet was more than 1.0 μm. The thickness of the foam was 0.8 mm. The total reflectivity of the foam sheet was 101%. The total reflectivity of the sheet ground out to have a thickness of 0.3 mm was 100%.

Comparative Example 2

A foam was obtained in the same manner as in the example 1 except for adding 1.0 part by mass of a modified SEBS (trade name: DYNARON 8630P, manufactured by JSR) to the poly(ethylene terephthalate) of the comparative example 1. The mean bubble diameter of the obtained sheet was 1.6 µm. The thickness of the foam was 0.8 mm. The total reflectivity of the foam sheet was 100%. The total reflectivity of the sheet ground out to have a thickness of 0.3 mm was 98%.

Comparative Example 3

A foam was obtained in the same manner as in the example 1 except for adding 3.0 parts by mass of a modified PE (trade name: BONDFAST E, manufactured by Toyobo Co., Ltd.) to the poly(ethylene terephthalate) of the comparative example 1. The mean bubble diameter of the obtained sheet was 3.0 µm. The thickness of the foam was 0.8 mm. The total reflectivity of the foam sheet was 99%. The total reflectivity of the sheet ground out to have a thickness of 0.3 mm was 97%.

Comparative Example 4

0.05 part by mass of a melt-type crystallization nucleating agent (trade name: NU-100, manufactured by New Japan Chemical Co., Ltd.) was blended with respect to 100 parts by mass of a poly(ethylene terephthalate) (trade name: NEH2070, manufactured by Unitika Ltd., IV value=0.85, temperature dropping crystallization peak=35 J/g) and the mixture was heated and melt-kneaded with a twin screw extruder, the obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in the hot-air circulating foam furnace set at 220° C. for 1 minute. The mean bubble diameter of the obtained sheet was as fine as 10 µm. The thickness of the foam was 0.8 mm. The total reflectivity of the foam sheet was 96%. The total reflectivity of the sheet ground out to have a thickness of 0.3 mm was 89%.

Comparative Example 5

3.0 parts by mass of a melt-type crystallization nucleating agent (trade name: NU-100, manufactured by New Japan Chemical Co., Ltd.) was blended with respect to 100 parts by mass of a poly(ethylene terephthalate) (trade name: J125S, manufactured by Mitsui Chemicals, Inc., IV value=0.77, temperature dropping crystallization peak=35 J/g) and the mixture was heated and melt-kneaded with a twin screw extruder, the obtained resin composition was then formed into a sheet with a size of 0.5 mm thickness×100 mm width×100 mm length. This resin sheet was contained in a pressure vessel and permeated with a carbon dioxide gas in the condition of a pressure at 5.5 MPa at 17° C. for 72 hours. Then, the resin sheet was subjected to heat foaming in the hot-air circulating foam furnace set at 220° C. for 1 minute. The mean bubble diameter of the obtained sheet was as fine as 20 µm. The thickness of the foam was 0.8 mm. The total reflectivity of the foam sheet was 94%. The total reflectivity of the sheet ground out to have a thickness of 0.3 mm was 89%.

TABLE 1

| | Additive | Blending amount | Thickness of sheet after foaming (mm) | Mean bubble diameter (µm) | Specific gravity (g/cm$^3$) | Expansion ratio | Total reflectivity |
|---|---|---|---|---|---|---|---|
| Example 1 | NU-100 | 0.25 | 0.8 | 0.5 | 0.5 | 3.1 | 101 |
| | | | 0.3 | | | | 101 |
| Example 2 | NU-100 | 0.5 | 0.8 | 0.5 | 0.5 | 2.9 | 101 |
| | | | 0.3 | | | | 101 |
| Example 3 | NU-100 | 1.0 | 0.8 | 0.5 | 0.5 | 2.6 | 101 |
| | | | 0.3 | | | | 101 |
| Example 4 | NU-100 | 1.5 | 0.8 | 0.5 | 0.5 | 2.5 | 101 |
| | | | 0.3 | | | | 101 |
| Example 5 | TF1 | 1.0 | 0.8 | 0.5 | 0.5 | 2.9 | 100 |
| | | | 0.3 | | | | 100 |
| Example 6 | NU-100 | 0.1 | 0.8 | 0.5 | 0.5 | 2.5 | 101 |
| | | | 0.3 | | | | 101 |
| Example 7 | NU-100 | 2.0 | 0.8 | 0.5 | 0.5 | 2.9 | 100 |
| | | | 0.3 | | | | 100 |
| Comparative example 1 | Hytrel 2551 | 2.0 | 0.8 | 1.0 | 0.5 | 2.9 | 101 |
| | | | 0.3 | | | | 100 |
| Comparative example 2 | DYNARON 8630P | 1.0 | 0.8 | 1.6 | 0.4 | 3.3 | 100 |
| | | | 0.3 | | | | 98 |
| Comparative example 3 | BONDFAST E | 3.0 | 0.8 | 3.0 | 0.4 | 3.8 | 99 |
| | | | 0.3 | | | | 97 |
| Comparative example 4 | NU100 | 0.05 | 0.8 | 10 | 0.5 | 3.3 | 96 |
| | | | 0.3 | | | | 89 |
| Comparative example 5 | NU100 | 3.0 | 0.8 | 20 | 0.5 | 2.4 | 94 |
| | | | 0.3 | | | | 89 |

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2010-191038 filed in Japan on Aug. 27, 2010, which is entirely herein incorporated by reference.

The invention claimed is:

1. A thermoplastic resin foam, prepared by mixing a thermoplastic resin composition containing a melt-type crystallization nucleating agent (B) in a crystalline thermoplastic resin (A), which foam comprises bubbles having a mean bubble diameter of less than 1 μm in the inside thereof, wherein the melt-type crystallization nucleating agent (B) is one or more of N,N'-dicyclohexyl-2,6-naphthalenedicarboxamide, trimesic acid tris(t-butylamide), trimesic acid tricyclohexylamide, trimesic acid tri(2-methylcyclohexylamide), trimesic acid tri(4-methylcyclohexylamide), 1,4-cyclohexane dicarboxylic acid dianilide, 1,4-cyclohexanoic acid dicarboxylic acid dicyclohexylamide, 1,4-cyclohexanoic acid dicarboxylic acid di(2-methylcyclohexylamide), 1,4-cyclohexanoic acid dicarboxylic acid dibenzylamide, 2,6-naphthalene dicarboxylic acid dicyclohexylamide, 1,2,3,4-butane tetracarboxylic acid tetracyclohexylamide and 1,2,3,4-butane tetracarboxylic acid tetraanilide.

2. The thermoplastic resin foam according to claim 1, wherein the crystalline thermoplastic resin (A) is a crystalline polyester resin.

3. The thermoplastic resin foam according to claim 1, wherein the melt-type crystallization nucleating agent (B) is contained in an amount of 0.1 to 2.0 part(s) by mass, with respect to 100 parts by mass of the crystalline thermoplastic resin (A).

4. The thermoplastic resin foam according to claim 1, wherein a total reflectivity at a light wavelength of 550 nm is 100% or more in terms of an aluminum oxide ratio.

5. A light reflecting material, which is molded by using the thermoplastic resin foam according to claim 1.

6. A method of producing a thermoplastic resin foam according to claim 1, comprising the steps of:
   impregnating a resin composition sheet containing a crystalline thermoplastic resin (A) and a melt-type crystallization nucleating agent (B) with an inert gas by maintaining the sheet in a pressurized inert gas atmosphere; and
   foaming by heating the sheet impregnated with the inert gas under normal pressure.

7. The method of producing a thermoplastic resin foam according to claim 6, wherein the crystalline thermoplastic resin (A) is a crystalline polyester resin.

8. The method of producing a thermoplastic resin foam according to claim 6, wherein the melt-type crystallization nucleating agent (B) is contained in an amount of 0.1 to 2.0 part(s) by mass, with respect to 100 parts by mass of the crystalline thermoplastic resin.

* * * * *